(12) United States Patent
Jibb et al.

(10) Patent No.: US 7,562,534 B2
(45) Date of Patent: *Jul. 21, 2009

(54) CRYOGENIC AEROGEL INSULATION SYSTEM

(75) Inventors: Richard John Jibb, Amherst, NY (US); John Henri Royal, Grand Island, NY (US); Norman Henry White, Tonawanda, NY (US); Steve Allan Schweichler, Lockport, NY (US); Wevone Hobbs, Cadiz, OH (US)

(73) Assignee: Praxair Technology, Inc., Danbury, CT (US)

( * ) Notice: Subject to any disclaimer, the term of this patent is extended or adjusted under 35 U.S.C. 154(b) by 422 days.

This patent is subject to a terminal disclaimer.

(21) Appl. No.: 11/386,677

(22) Filed: Mar. 23, 2006

(65) Prior Publication Data
US 2007/0220904 A1    Sep. 27, 2007

(51) Int. Cl.
*F17C 13/00* (2006.01)
*F17C 3/08* (2006.01)
*F17C 1/00* (2006.01)
*F17C 3/00* (2006.01)

(52) U.S. Cl. .................. 62/50.7; 62/45.1; 220/560.12

(58) Field of Classification Search ............... 62/45.1, 62/50.7; 220/560.12
See application file for complete search history.

(56) References Cited

U.S. PATENT DOCUMENTS

| | | | |
|---|---|---|---|
| 3,122,520 A | 2/1964 | Lentz | |
| 3,812,886 A | 5/1974 | Hallwood | 138/149 |
| 4,447,345 A | 5/1984 | Kummermehr et al. | |
| 4,606,196 A | 8/1986 | Acharya et al. | 62/45 |
| 4,924,679 A | 5/1990 | Brigham et al. | 62/50.7 |
| 5,386,706 A * | 2/1995 | Bergsten et al. | 62/45.1 |
| 6,010,762 A * | 1/2000 | Smith et al. | 428/69 |
| 6,068,882 A * | 5/2000 | Ryu | 427/246 |
| 6,216,745 B1 | 4/2001 | Augustynowicz et al. | 138/149 |
| 6,257,282 B1 * | 7/2001 | Emmer et al. | 138/149 |
| 6,598,283 B2 | 7/2003 | Rouanet et al. | 29/455.1 |
| 6,658,863 B2 | 12/2003 | Beck et al. | |
| 6,670,402 B1 | 12/2003 | Lee et al. | |
| 6,967,051 B1 | 11/2005 | Augustynowicz et al. | 428/68 |
| 7,305,837 B2 * | 12/2007 | White | 62/50.7 |
| 2004/0087670 A1* | 5/2004 | Lee et al. | 516/99 |

FOREIGN PATENT DOCUMENTS

| DE | 10114633 A1 | 9/2002 |
|---|---|---|
| DE | 10259551 A1 | 7/2004 |
| DE | 10259553 A1 | 7/2004 |
| EP | 1431686 A1 | 6/2004 |

OTHER PUBLICATIONS

Greg, S.J. et al., "Adsorption, Surface Area and Porosity", p. 285-286, Academic Press, New York (1991).

* cited by examiner

*Primary Examiner*—William C Doerrler
(74) *Attorney, Agent, or Firm*—David M. Rosenblum

(57) ABSTRACT

A method for establishing a cryogenic insulation system wherein aerogel is provided to a sealable insulation space which is pressurized and depressurized, preferably using carbon dioxide gas, and cooled to cryogenic temperatures typically by the application of refrigeration from cryogenic liquid.

14 Claims, 1 Drawing Sheet

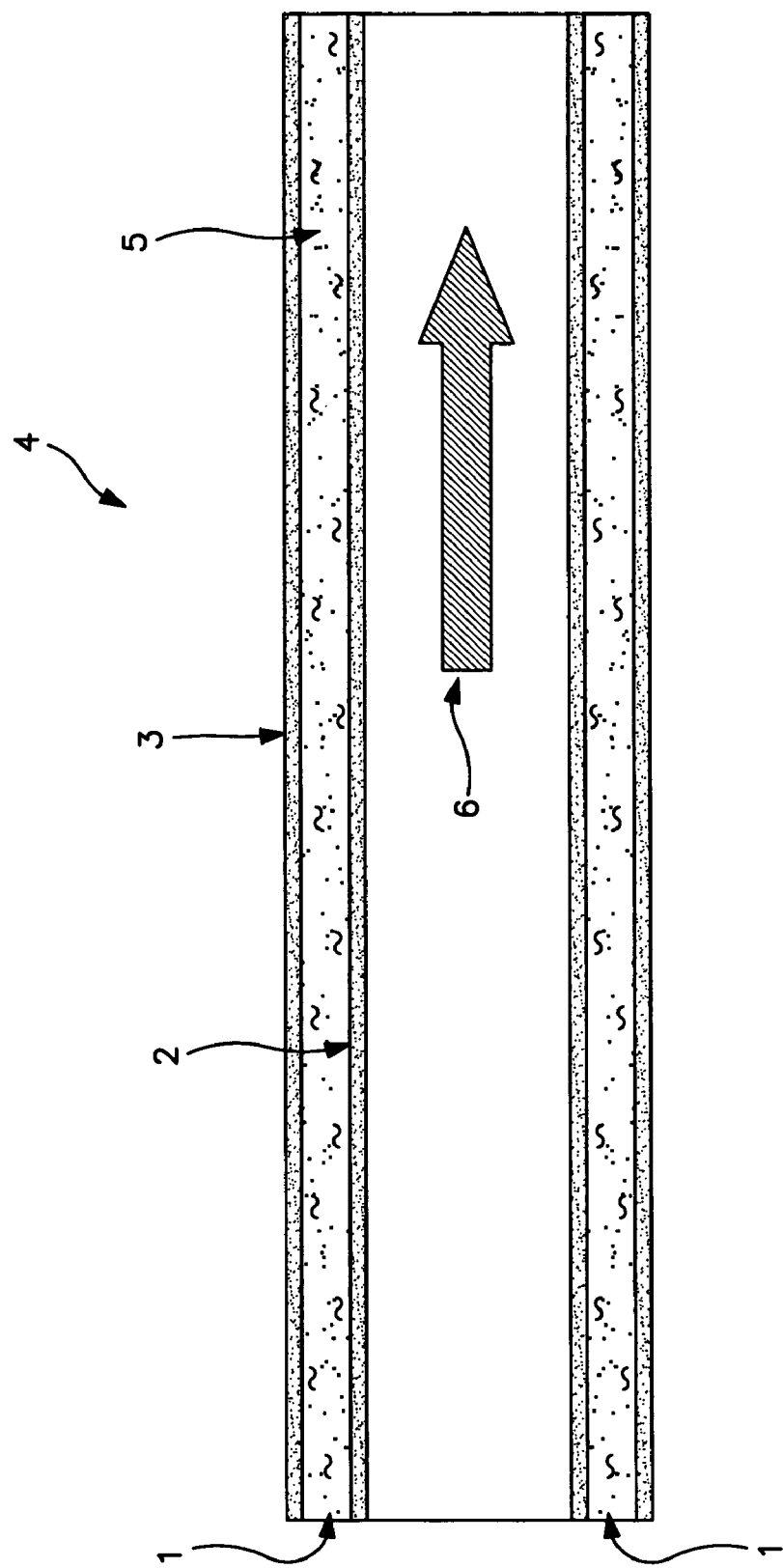

CRYOGENIC AEROGEL INSULATION SYSTEM

TECHNICAL FIELD

This invention relates generally to insulation systems and, more particularly, to insulation systems intended for use at cryogenic temperatures.

BACKGROUND ART

Conventional cryogenic vacuum insulation systems for double walled vessels require a hard vacuum, typically less than 1 micron Hg at 0° C. The purpose of the vacuum is to reduce gas conduction/convection. The hard vacuum required is expensive to produce, requiring long pump out times at elevated temperature. This results in a high manufacturing cost for vacuum insulated equipment. Once obtained, the hard vacuum is notoriously difficult to maintain over the useful life of the equipment, which may typically be from 15 to 20 years, and it is found in practice that, despite all the precautions, the pressure in the vacuum space inevitably rises causing a dramatic loss of performance. One alternative is to use foam insulation. However this insulation has much higher heat leak than vacuum insulation. Unless elaborate measures are taken to weatherseal foam insulations, the infiltration of water will cause them to degrade rapidly. Accordingly, a cryogenic insulation system is required which is reliable over its lifetime, inexpensive to fabricate, has a high performance, and is relatively insensitive to loss of vacuum.

SUMMARY OF THE INVENTION

A method for establishing a cryogenic insulation system comprising:
 (A) providing an insulation space containing aerogel and defined by an inner wall and an outer wall;
 (B) conducting at least one pressurization and at least one depressurization of the aerogel containing insulation space wherein the pressurization comprises providing condensable gas to the aerogel containing insulation space; and
 (C) cooling at least one wall of the aerogel containing insulation space to a temperature less than 190 K.

As used herein the term "condensable gas" means a gas having a vapor pressure at the cold condition which is significantly lower than the pressure which would be expected by applying the ideal gas law at the average temperature of the insulation space. Typically this will result from the condensable gas undergoing a phase change from gas to solid. However, the aerogel insulation has an extremely high specific area, and when cooled to cryogenic temperature is capable of adsorbing some quantity of gas.

BRIEF DESCRIPTION OF THE DRAWING

The sole FIGURE is a simplified cross sectional representation of one embodiment of the invention wherein the insulation space is defined by the walls of a double walled conduit.

DETAILED DESCRIPTION

The invention is applicable for use with any double walled structure or vessel such as a double-walled pipe or a double walled tank. The FIGURE illustrates a section of double-walled pipe or conduit and the invention will be discussed in greater detail with reference to the FIGURE.

Referring now to the FIGURE, insulation space 1 is the volume defined by inner wall 2 and outer wall 3 of double walled conduit 4. Insulation space 1 contains aerogel 5 which may be in the form of an aerogel composite such as a blanket which comprises aerogel combined with fibrous batting such as polyester, fiberglass, carbon fiber, silica fiber and mixtures thereof. Preferably at least 75 percent of the volume of the insulation space is filled with aerogel or aerogel composite.

Any suitable aerogel may be used in the practice of this invention. The preferred aerogel in the practice of this invention is silica aerogel. Aerogel can be produced as a monolithic block, as a particulate in the form of granules, beads or powder fines, or as a composite aerogel blanket which incorporates fibrous batting. A gel or aerogel is a coherent, rigid, continuous three-dimensional network of colloidal particles. Gels are produced by the aggregation of colloidal particles, typically under acidic conditions when neutralizing salts are absent, to form a three-dimensional gel microstructure. When a gel is dried, i.e. when liquid is removed from the pores, by means in which the coherent gel microstructure is preserved, such as by supercritical drying, a low-density gel or an aerogel is formed. A suitable process for the production of an aerogel is described in U.S. Pat. No. 3,122,520. A suitable process for the production of an aerogel composite is described in U.S. Pat. No. 6,670,402. The aerogel preferably is a metal oxide aerogel, particularly a silica aerogel. The aerogel particles can have any suitable density, preferably about 0.05 g/cm.sup.3 to about 0.15 g/cm.sup.3. The aerogel particles also can have any suitable surface area, preferably at least about 200 m.sup.2/g. The surface area described herein is calculated based on the amount of nitrogen adsorbed at five different relative pressures over the range 0.05 to 0.25 atm according to the Brunauer-Emmett-Teller (BET) model, referenced in Gregg, S. J., and Sing, K. S. W., "Adsorption, Surface Area and Porosity", p. 285, Academic Press, New York (1991).

Aerogel particles have highly desirable properties such as, for example, optical transparency, extremely low density, and very low thermal conductivity. The aerogel particles can have any suitable diameter. Preferably, the diameter of substantially all of the aerogel particles is about 0.5 mm or more (e.g., about 1 mm or more). More preferably, the diameter of substantially all of the aerogel particles is about 5 mm or less (e.g., about 0.5 or 1 mm to about 5 mm). The aerogel may be employed in the practice of this invention in any suitable form. For example, the aerogel may be incorporated into a blanket by mixing it with fibers such as polyester, fiberglass, carbon fiber, silica or quartz fibers, depending upon the application. The composite aerogel/fiber blanket is then wrapped tightly around the pipe in a series of layers. In this configuration it is possible to provide radiation shielding by interleaving thin sheets of a low emissivity material, typically a polished metal such as copper or aluminum. A second advantage of this option is that the aerogel can be wrapped using existing machinery for applying Multi-Layer Insulation.

A second option is to fill the double walled space with a particulate form of aerogel. Various powders, granules and beads are available in size ranges from 0.5 to 5.0 mm. To fill an insulating space with particulate it is generally desirable to orient the pipe vertically so the annular space fills from the bottom upwards. This ensures that there are no void spaces which can adversely affect performance. Numerous methods are available for handling powders. The suitable method for conveying the aerogel is to use a vacuum conveyor.

It is also possible to package the aergoel in preformed bags. Each bag is filled with aerogel and purged with a condensable gas, preferably carbon dioxide. The bag is then evacuated, ideally to a pressure in the range of between 1000 to 10,000 microns, and sealed. Under ambient pressure the volume of the bag is reduced, so it fits easily in the insulation space. For large insulation spaces such as tanks, trailers etc., multiple bags can be used to fill the insulation space. For smaller insulation spaces such as conduits the bag can be preformed to a clamshell shape which conforms to the contours of the insulation space. If aerogels are packed in this way, the insulation space should still be purged with condensable gas, and will be evacuated to a pressure similar to the internal pressure of each bag. Suitable bag materials are polymeric materials with a permeability low enough to allow vacuum to be maintained for the duration of the assembly process. With this system it is necessary to ensure that a sufficient fraction of the insulation volume is filled with the aerogel containing bags such that when the bags expand there are no void spaces.

A third option is to combine the use of aerogel composite blankets and aerogel particulates. In all cases it is possible to use either a hydrophilic or hydrophobic form of aerogel. The hydrophobic aerogel particulate can be compressed without losing its structure, and has a low water content. The hydrophilic aerogel is less compressible and has a high affinity for water. Moreover, the hydrophilic aerogel is non-flammable in pure oxygen and is therefore more suitable for this service.

To seal the double walled space the ends must be welded, such that the space is hermetically sealed. A high temperature aerogel blanket or a fiberglass material which is not damaged by the high temperature of the welding process should be used near the welds. When fabricating a double walled conduit, a means for allowing for differential expansion of the inner pipe relative to the outer pipe must be provided. In general this is achieved by supplying an expansion bellows. The bellows are often placed in the jacket because in this case the bellows are exposed to vacuum pressure rather than process pressure. The chief disadvantage of this placement is that at operating temperature, the length of the jacket is reduced and the pipe support system must be designed to accommodate the movement. Although the bellows are exposed to environmental and mechanical damage, in the event of failure the consequence is limited to loss of vacuum. A second method for allowing for differential thermal expansion is to use sections of flex hose in either the inner or the outer pipe.

The aerogel containing insulation space is purged. Preferably a vacuum pump is used initially to evacuate the insulation space to a pressure within the range of from 1000 to 10000 microns Hg in order to remove any moisture or heavy hydrocarbons in the aerogel material left over from manufacture. The aerogel containing insulation space then undergoes at least one pressurization and at least one depressurization wherein the pressurization comprises providing a condensable gas such as carbon dioxide gas, i.e. a fluid comprising at least 99.5 mole percent carbon dioxide, to the aerogel containing insulation space. Other condensable gases which may be used include $N_2O$, R-134a, nitrogen, oxygen and argon. The pressurization step may be as high as the pressure rating of the outer wall. The depressurization step may be as high as one atmosphere or as low as 10 microns but typically will be within the range of from 1000 to 10000 microns. Preferably the aerogel containing insulation space undergoes at least two such cycles and may undergo up to about 10 such cycles. Preferably the final pressure of the insulation space following the last depressurization is within the range of from 1000 to 10000 microns.

At least one wall, preferably only the inner wall, of the aerogel containing insulation space is cooled to a temperature less than 190K. Preferably this cooling is carried out by providing cryogenic liquid, such as liquid 6 shown in the FIGURE, to the double walled vessel. Suitable cryogen liquids include liquid nitrogen, liquid oxygen, liquid argon, liquefied natural gas, liquid helium and liquid hydrogen. As the temperature within the aerogel containing insulation space falls, and when at least one wall or inner surface of the double-walled structure is cooled to the requisite temperature, a further pressure reduction occurs. The aerogel containing insulation space is cooled, preferably to a temperature less than the freezing point of the condensable gas at the desired final pressure (typically 1-5 microns). During cooling the temperature within the aerogel containing insulation space falls. If the wall or surface of the double walled structure is cooled to a temperature at or below the freezing point of the condensable gas at the prevailing pressure, the condensable gas, e.g. carbon dioxide, will migrate to the inner surfaces and freeze, further reducing the pressure in the insulation space. The aerogel; the blanket, if any; and any getters will adsorb the condensable and non-condensable gases adding to the initial vacuum strength of the insulation space, as well as removing any in leakage which occurs over time.

During operation there will inevitably be a rise in pressure in the insulation space due to leakage through small capillaries or other openings in the vacuum space, outgassing from materials exposed to the vacuum space and/or permeation of gases through the walls of the vacuum space. Traditional vacuum insulation requires a vacuum in the range of from 1 to 10 microns to be effective. The aerogel vacuum system of this invention remains effective in the range of from 10 to 10000 microns wherein effective is defined as having a heat leak lower than non-vacuum foam type insulation. Since the acceptable working pressure for an aerogel vacuum system is much higher than traditional vacuum insulation, significant leakage can be tolerated before a drastic loss of insulating performance occurs. It is an important aspect of this invention that elaborate measures do not need to be taken to ensure the pressure in the aerogel containing insulation space is low enough. This results in an economic benefit, because the cost to manufacture the equipment is reduced.

The various types of insulation used in the storage and transfer of cryogenic liquids can be conveniently subdivided into five categories (1) vacuum; (2) multilayer insulation; (3) powder and fibrous insulation; (4) foam insulation; and (5) special purpose insulations. The boundaries between these general categories are by no means distinct. For example, a powder insulation can either contain a gas or be evacuated and could, in the latter case, exhibit properties very similar to that of vacuum insulation. This classification scheme, does, however, offer a framework by which the widely varying types of cryogenic insulation may be discussed.

Heat transfer through these various insulations can occur by several different mechanisms, but generally involves solid conduction, gas conduction and convention, and radiation. The purpose of any insulation is to minimize the summed transfer of heat by these various mechanisms. The apparent thermal conductivity of an insulation, measure experimentally to incorporate all of these heat transfer modes, offers the best means by which to compare the different types of insulation. The insulation space in the practice of this invention has an apparent thermal conductivity of less than 3 mW/mK at a pressure greater than 10 microns.

There are various mechanical designs for the conduit, which include bellows on the inner tube, bellows on the outer tube and bellows at the end of each section. Flexible conduit is also available. Aerogel blankets would be suitable for incorporation into the latter. In some cases it may be desirable to incorporate a molecular sieve material, preferably as close to the inner wall as possible, to adsorb unwanted oxygen and nitrogen which may leak in from the atmosphere, and/or cryogenic fluid which leaks into the insulation space. Aerogels have an extremely high specific surface area and when cooled to cryogenic temperatures are capable of adsorbing some quantities of unwanted gases such as nitrogen and oxygen. Moreover, the invention can include any of the measures traditionally used to ensure vacuum such as getters and molecular sieves and may also include radiation shielding.

Although the invention has been described in detail with reference to certain preferred embodiments, those skilled in the art will recognize that there are other embodiments of the invention within the spirit and the scope of the claims.

The invention claimed is:

1. A method for establishing a cryogenic insulation system comprising:
   (A) providing an insulation space containing aerogel and defined by an inner wall and an outer wall;
   (B) conducting at least one pressurization and at least one depressurization of the aerogel containing insulation space wherein the pressurization comprises providing condensable gas to the aerogel containing insulation space and the depressurization is to a level below atmospheric pressure; and
   (C) after the at least one depressurization is completed, cooling at least one wall of the aerogel containing insulation space to a temperature less than 190 K such that the condensable gas condenses to cause a further pressure reduction to occur and the aerogel adsorbs some quantity of the condensable gas and any non-condensable gases present within the insulation space to cause a yet further pressure reduction to occur within the insulation space.

2. The method of claim 1 wherein the insulation space is between an inner wall and an outer wall of a double-walled conduit.

3. The method of claim 1 wherein the insulation space is between an inner wall and an outer wall of a double-walled tank.

4. The method of claim 1 wherein the aerogel is in the form of aerogel blanket.

5. The method of claim 4 wherein the aerogel blanket comprises aerogel combined with fibrous batting.

6. The method of claim 1 wherein the aerogel is in particulate form.

7. The method of claim 1 wherein the condensable gas is carbon dioxide.

8. The method of claim 1 wherein at least two pressurization and depressurization cycles are conducted on the aerogel containing insulation space.

9. The method of claim 1 wherein the aerogel containing insulation space is cooled by refrigeration from cryogenic liquid.

10. The method of claim 1 wherein the aerogel containing insulation space further comprises radiation shielding.

11. The method of claim 1 wherein the aerogel comprises silica aerogel.

12. The method of claim 1 wherein the insulation space prior to the cooling has a pressure within the range of from 1000 to 10000 microns.

13. The method of claim 1 wherein the insulation space is evacuated prior to the said pressurization using a vacuum pump.

14. The method of claim 1 wherein the insulation space has an apparent thermal conductivity of less than 3 mW/mk at a pressure greater than 10 microns.

* * * * *